(12) United States Patent
Wiencek et al.

(10) Patent No.: US 8,073,603 B2
(45) Date of Patent: Dec. 6, 2011

(54) METHOD FOR CONTROLLING AN AUTOMATIC TRANSMISSION

(75) Inventors: Norbert Wiencek, Hagnau (DE);
Andelko Vesenjak, Meckenbeuren (DE);
Thomas Jäger, Meckenbeuren (DE);
Mario Steinborn, Friedrichshafen (DE);
Ramon Cordt, Friedrichshafen (DE);
Peter Herter, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 701 days.

(21) Appl. No.: 11/579,358

(22) PCT Filed: Apr. 28, 2005

(86) PCT No.: PCT/EP2005/004532
§ 371 (c)(1),
(2), (4) Date: Aug. 25, 2008

(87) PCT Pub. No.: WO2005/108827
PCT Pub. Date: Nov. 17, 2005

(65) Prior Publication Data
US 2009/0005942 A1 Jan. 1, 2009

(30) Foreign Application Priority Data
May 3, 2004 (DE) .......................... 10 2004 021801

(51) Int. Cl.
*G06F 7/00* (2006.01)
*G06F 17/00* (2006.01)
(52) U.S. Cl. ................ 701/65; 701/51; 701/53; 701/55; 701/56; 701/68

(58) Field of Classification Search .................. 180/269, 180/54.1–54.2, 55–63, 291–300, 337–385, 180/336; 192/3.51–3.59, 3.61–3.63; 290/782; 701/51–68
See application file for complete search history.

(56) References Cited

U.S. PATENT DOCUMENTS

| | | | | |
|---|---|---|---|---|
| 5,035,160 | A | * | 7/1991 | Morita .......................... 477/154 |
| 5,036,730 | A | * | 8/1991 | Sakai et al. ..................... 701/57 |
| 5,212,998 | A | * | 5/1993 | Testerman ..................... 74/335 |

(Continued)

FOREIGN PATENT DOCUMENTS
DE 43 12 717 A1 11/1993
(Continued)

OTHER PUBLICATIONS

Bauknecht, G et al., "Das Neue Funfgang-Automatikgetriebe Für Die Uberarbeiteten BMW Achtzylindermotoren", *ATZ Automobiltechnische Zeitschrift*, Franckh., Stuttgart, Germany, Bd. 98, Nr. 10, Oct. 1996, pp. 508-514, 516, 51, XP000629647, ISSN: 0001-2785, Absatz '4.3.5!.

*Primary Examiner* — Khoi Tran
*Assistant Examiner* — Bhavesh V Amin
(74) *Attorney, Agent, or Firm* — Davis & Bujold, P.L.L.C.

(57) ABSTRACT

An automatic transmission control method in which at least one of a starting clutch, a clutch coupling and transmission elements, for selection as well as engagement and disengagement of a gear step, are determined as a function of respectively existing variables representing the driving situation as well as the driver's wishes can be activated by actuators which are controlled by a control and regulation device. The method comprising the steps of collecting and normalizing the input variable into standard input variables; weighting with weighting factors and summarizing; converting the weighted input variables into intermediate variables; selecting a specific range of values which represents a specific shifting sequence; and implementing the shifting operation.

14 Claims, 2 Drawing Sheets

U.S. PATENT DOCUMENTS

| | | | |
|---|---|---|---|
| 5,231,582 A * | 7/1993 | Takahashi et al. | 701/56 |
| 5,428,531 A * | 6/1995 | Hayafune | 701/65 |
| 5,487,005 A * | 1/1996 | Genise | 701/36 |
| 5,489,247 A * | 2/1996 | Markyvech et al. | 477/120 |
| 5,510,982 A * | 4/1996 | Ohnishi et al. | 701/55 |
| 5,519,610 A | 5/1996 | Tsutsui et al. | |
| 5,557,519 A * | 9/1996 | Morita | 701/1 |
| 5,748,472 A | 5/1998 | Gruhle et al. | |
| 6,311,114 B1 | 10/2001 | Graf et al. | |
| 6,324,456 B2 | 11/2001 | Bosse | |

FOREIGN PATENT DOCUMENTS

| | | |
|---|---|---|
| DE | 197 52 623 A1 | 6/1999 |
| DE | 198 27 133 A1 | 12/1999 |
| EP | 0 870 953 A1 | 10/1998 |
| GB | 2 285 146 A | 6/1995 |

* cited by examiner

METHOD FOR CONTROLLING AN AUTOMATIC TRANSMISSION

This application is a national stage completion of PCT/EP2005/004532 files Apr. 28, 2005 which claims priority from German Application Serial No. 10 2004 021 801.3 filed May 3, 2004.

FIELD OF THE INVENTION

The application concerns a control method of an automatic transmission.

BACKGROUND OF THE INVENTION

Automatic transmissions have been used in various types of vehicles for a fairly long period of time. As is known, such automatic transmissions have favored the operation of a starting clutch and a clutch coupling, as well as the assortments of switch valves and the engagement and the disengagement of gears is made possible with the help of hydraulic actuators which were developed as piston-cylinder arrangements. On the other hand, there are vehicles in existence that only rely upon a starting clutch or a clutch coupling or on those elements of the transmission that are purely essential. Activation of the aforementioned actuator is controlled by the transmission gearbox with the aid of control and regulating programs, based on information about the driving situation, the shifting situation as well as the desired performance of the vehicle operator in relation to the clutch and the shift options.

Even if these transmissions, compared to other types of automatic transmissions such as continuous variable transmissions or conventional stepped automatic transmissions using planetary gears, are simple in construction and relatively inexpensive, these automatic gearboxes exhibit an interruption in traction during shifting operations, which the operator or passengers of the vehicles in particular can experience as uncomfortable. The interruption of traction with the use of these types of automatic transmissions in commercial vehicles, however, can also prove to be disadvantageous or at least as having a diminished comfort when, for example, a truck with a heavy load at an intersection can only execute a very slow starting process.

Those skilled in the art know that a gear ratio change sequence in an automatic transmission can be roughly subdivided into three phases. For a motor vehicle proceeding in a driving state, first there is the gear disconnection of the gear step previously utilized, as well as disengagement of the starting clutch and the clutch coupling, through which the torque transfer from the motor to the transmission is interrupted. Following this is the selection of the new gear position for shifting and, as the case may be, engagement of the necessary transmission elements for the new transmission gear after which the coupling is engaged and a new load build up follows.

For all of these shifting phases, the torque of the vehicle is influence deviated from the real wishes of the driver, who obviously wishes a forward creep free of any tractive force interruption. The primary goal of a person skilled in the art of the development of transmissions is, therefore, to attain as quickly as possible the necessary shifting intervals for each of these phases. In contrast, a very short shifting causes a diminution of the shifting comfort as well as stronger mechanical stress on the transmission components involved in the shifting process through an associated rapid change in torque. For these mentioned reasons, the actually realized shifting time in an automatic transmission is always a compromise between conflicting interests relevant to the shortest possible shifting time, the highest possible shifting comfort as well as the lowest possible component stresses.

The invention is based upon the knowledge that a portion of the factors influencing actual shifting time are not constant but rather are a function of the respective driving situation, the individual motor vehicle configuration for a specified vehicle type, as well as different driving preferences regarding the comfort and the speed of shifting.

Purely theoretically, a number of combinations to be applied arise from the variables influencing the optimal shifting sequence which can no longer be meaningfully controlled by a control and regulatory program in this regard, which would ultimately lead to many different shifting operations with individual shifting times, component loads and shifting comfort.

Moreover, a desire exists on the part of manufacturers of automated transmissions from the point of view of cost-savings of developing a uniform control and regulation program for all these types of transmissions which takes into consideration the respective motor vehicle type, its manner of use, as well as the individual driving conditions and the driving preferences.

Against this background, the invention is based upon the objective of presenting a method for controlling an automatic transmission with which, as a function of the mentioned influencing factors, such as possibly the driving conditions, the vehicle configuration and the performance wish of the operator, where a shifting operation which is appropriate to the situation and optimal with regards to its duration, shifting comfort and the individual component stresses can be implemented with an automatic transmission. Moreover, this method should be suited for being used without major changes in the transmission gearbox for various types of automatic gearboxes.

SUMMARY OF THE INVENTION

The invention is based on the fundamental idea that only a few types of shifting sequences can be constructed, based on a multitude of variables determining or influencing the shifting process which, in this regard, determine the duration of the shift, the shifting comfort and the stress upon the individual components associated with the gear ratio shifting process of an automatic transmission. These types of shifting sequences only slightly restrain the performance level regarding various requirements so that, in the end, the shifting processes is optimally adapted to the respective conditions or else optimally short and comfortable shifting sequences are to be obtained.

Accordingly, the invention proceeds from a method for controlling an automatic transmission in which a starting clutch and/or a clutch coupling and/or transmission elements for the selection, as well as the engagement and the disengagement of the gear steps determined as a function of the respectively existing variables representing the driving situation as well as the wish of the driver can be activated by actuators which are controlled by a control and regulation device.

The following operation steps are provided as a solution to the proposed problem in accordance with an initial embodiment:

recording of the interacting input variables of the shifting operation, normalizing the input quantities to standard input variables, weighting of the standardized input variables with weighting factors, summarization of the standardized and weighted input variables, summarization and/or multiplication of the standardized and weighted input variables into an intermediate variable, classification of the intermediate variable in one or more specific ranges of values which, in each case, represent a specific shifting sequence, implementation of the shifting operation through recognition of the actuator with the assistance of the acquired type of shifting sequence of allocated actuator control variables and/or regulation algorithms.

Through this course of action it is assured that the actuators, for clutch activation and/or for the selection and shifting operations, are controlled and/or regulated as a function of the variables which depend not only on the driving situation or the performance desires of the operator but which, moreover, take into consideration the type of vehicle as well as its type of use. In this way, this method can be utilized as a program module for various clutch control mechanisms in various automatic transmissions.

The following procedural steps are provided in accordance with a second embodiment of the method:

recording of the interacting input variables of the shifting operation, normalizing the input quantities into standard input variables, weighting of the standardized input variables with weighting factors, summarization of the standardized and weighted input variables, summarization and/or multiplication of the norms and weighted input variables into intermediate variables, utilization of the intermediate variables as variation factors, whose actuator control variables and/or regulator algorithms is associated with at least one of the actuators, implementation of the shifting operation through recognition of at least one of the actuators with the assistance of variation factors of adapted actuator control variables and/or regulation algorithms.

This method also possesses the same advantages as the first mentioned embodiment of the method. Nonetheless, here the mentioned intermediate variables are directly associated with the actuator control variables and/or the regulation algorithms, owing to which storage capacity and, if need be, a calculation time in a clutch control mechanism is also optimized.

BRIEF DESCRIPTION OF THE DRAWINGS

The invention will now be described, by way of example, with reference to the accompanying drawings in which.

DETAILED DESCRIPTION OF THE INVENTION

Figure 1:
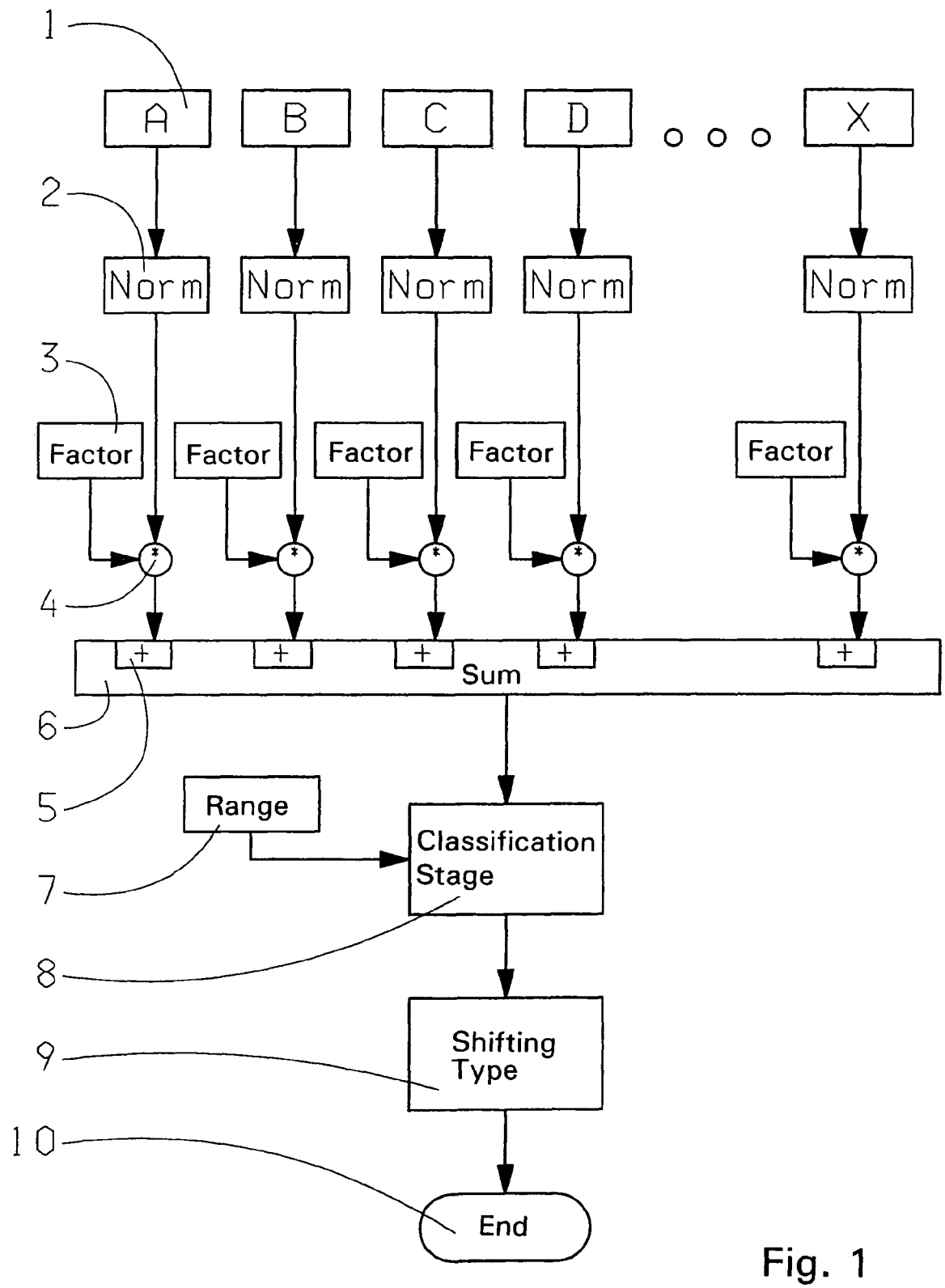
FIG. 1 illustrates a schematic flow-diagram for a data processing program of a transmission control mechanism in accordance with a first embodiment of the method, and FIG. 2 provides an illustration, as in FIG. 2, but of a second embodiment of the method.
Figure 2:
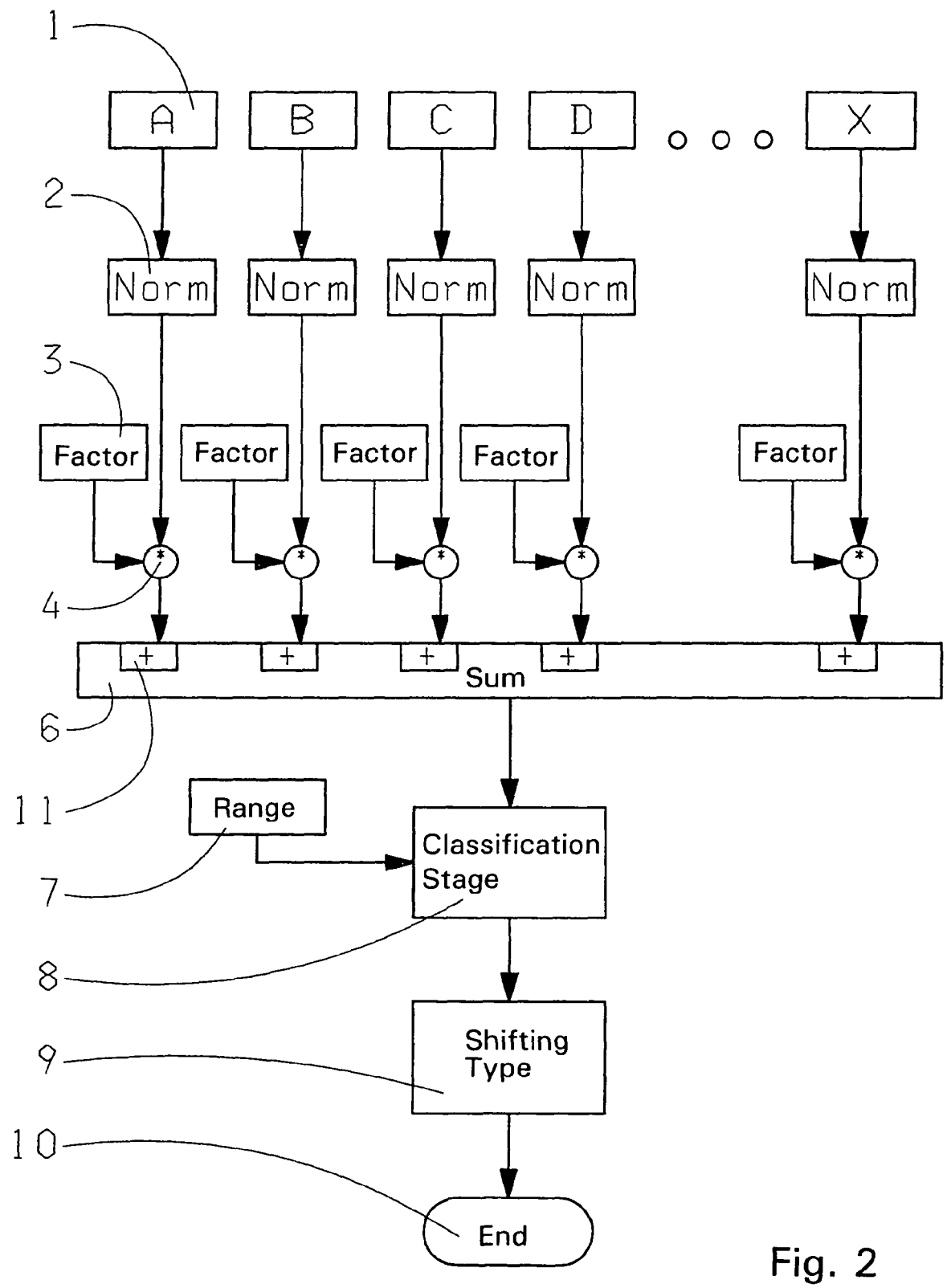

As FIG. 1 and FIG. 2 illustrate, a large number of driving situation-relevant variables A, B, C, D, X are available as input variables 1 during operation of a program loop of a transmission control program configured in accordance with the invention.

For example, the accelerator adjustment angle, the activation situation with reference to a kick-down-switch of an accelerator, the brake activation signal for an activation state of the service brake of the motor vehicle, the vehicle speed or variables equivalent to it, the motor vehicle's longitudinal acceleration, the vehicle's lateral acceleration driving resistance, the gradient angle of the roadway, the current gear being utilized, the target gear for the present driving condition, the current engine torque of the vehicle gearbox and the clutch temperature, as an indicator of the thermal stress conditions of the clutch, are used as input variables 1, either additively or alternatively, for both method embodiments of the invention as driving situation characteristic variables. The concomitant evaluation of the current motor vehicle mass is determined to be an advantageous parameter for the status of the vehicle.

The input variables 1 are calculated, either directly by way of sensors in an inherently known manner or from auxiliary measured variables, or measured directly. Therefore, it is known how to determine the traveling speed, for example, from the transmission output rotational speed.

The values of the input variables 1 are then standardized at calculation step 2 whereby the input variable is divided by a respectively allocated or predetermined maximum value. In FIGS. 1 and 2, the respective calculation step 2 is indicated by the label "Norm".

Subsequently, according to both method embodiments, the values of the standardized input variables are respectively multiplied by a preferred individual weighting factor 3 ("Factor") which is shown in the both Figures at the allocated multiplication step 4.

By the weighting factors 3 it is a matter of characterizing variables, such as the type of motor vehicle, the type of transmission, the performance characteristics of the drive motor and/or the construction of the drive train. The characterizing variable of the drive train construction reflects whether the vehicle is front-wheel drive or rear-wheel drive or is equipped with all-wheel drive.

Through weighting factors 3, the above mentioned standardized initial variable is weighted in such a way that the significance of the individual input variables 1 can be evaluated, possibly overemphasized or moderately or even largely neglected, for realization of the quickest possible shift, for example, or possibly for the most comfortable shifting operation.

For this purpose, it is provided that the weighting factors 3 can also allow for whether the automatic transmission is being used in a passenger motor vehicle, in a truck or in some other commercial vehicle. According to a further refinement of the invention, it is determined to be advantageous if the weighting factors 3 also characterize whether the commercial vehicle is constructed as a long distance truck, a city delivery vehicle, a travel bus or a cross-country vehicle.

Subsequently, the standardized and weighting values of the input variables 1 are added, in accordance with a first method embodiment represented in FIG. 1 at addition step 5 of each program loop, into an intermediate variable 6 which is then fed to a classification stage 8. At the classification stage 8, the intermediate value 6, calculated as described, is allocated one of several predetermined classification ranges stored in a classification range memory 7 ("Range"). In the classification range memory 7, a shifting sequence type 9 is assigned to each of these classification ranges so that the initial value of the classification step 8 is one of several shifting sequence types.

The limits of the classification ranges, for determination of the shifting sequence 9, are preferably chosen depending on type of the vehicle, the transmission type, the performance characteristics of the drive motor and/or the construction of the drive train.

As shown in FIG. 2, the standardized and the weighting values of input variables 1 can be multiplied by one another, at the multiplication step, to form the intermediate variable 6.

Not shown, but likewise being part of the invention, is a third embodiment in accordance with which the standardized and the weighted values of the input variables 1 can be multiplied, added to or subtracted from each other.

In accordance with method variations defined by independent claim 1, the respective shifting sequence types 9 are assigned actuator control variables and/or regulation algorithms with the assistance of which the actuator of the transmission and/or the clutch are actuated and the gear ratio change sequence is achieved.

Following determination of the shifting sequence type 9, operation of the program loop, shown in accordance with FIG. 1 and FIG. 2, is ended upon reaching sequence section 10, so that with a renewed accommodation of the evaluation of the input variables 1, a newly initiated gear ratio change process can be continued or can be altered with respect to shifting comfort and/or the duration of the shifting operation.

In accordance with the second embodiment, it can be provided that the intermediate variable 6 is utilized as a discrete variation factor, which is linked with actuator control variables and/or control algorithms for activation actuation of at least one of the actuators such that the shifting operation occurs with the activation of at least one actuator as well.

Such linking of the intermediate variable 6 in the sense of a change factor can, for example, run such that a variable influencing the gradient of an actuator activation speed is directly changed so that a clutch engaging process can possibly proceed more rapidly, or more slowly, following a mathematical function.

It is, however, possible that these intermediate values act in the sense as changing factors that a second of two shift valves are opened with which the aforementioned activation speed is constantly increased, for example, in relation to a previous value.

REFERENCE NUMERALS 1 input variables A, B, C, D, and X
2 standardization of the input values
3 weighting factor
4 multiplication step
5 addition step
6 intermediate value
7 classification range memory
8 classification stage
9 shift type
10 end of program loop
11 multiplication step

The invention claimed is:

1. A method for controlling an automatic transmission, in which at least one of a starting clutch, a clutch coupling and transmission elements for selection as well as engagement and disengagement of a gear step are determined as a function of respectively existing variables representing a driving situation as well as a wish of a driver can be activated by actuators which are controlled by a control and regulation device, the method comprising the steps of:
   collecting input variables for a shifting operation;
   normalizing the input variable into standard input variables;
   weighting of the standardized input variables with weighting factors;
   summarizing the standardized and weighted input variables,
   one of summarizing and multiplying of the norms and weighted input variables into intermediate variables;
   classifying the intermediate variables into at least one specific range of values which represents a specific shifting sequence; and
   implementation of the shifting operation through recognition of the actuator with the assistance of an acquired type of shifting sequence of at least one of assigned actuator control variables and regulation algorithms.

2. A method for controlling an automatic transmission, in which at least one of a starting clutch, a clutch coupling and transmission elements for selection as well as engagement and disengagement of a gear step are determined as a function of respectively existing variables representing a driving situation as well as a wish of a driver can be activated by actuators which are controlled by a control and regulation device, the method comprising the steps of:
   recording of interacting input variables of the shifting operation;
   normalizing the input variables into a standard input variables;
   weighting of the standardized input variables with weighting factors,
   summarization of the standardized and weighted input variables;
   at least one of summarizing and multiplying the norms and weighted input variables into intermediate variables;
   utilizing the intermediate variables as variation factors, whose actuator control variables and/or regulator algorithms is associated to at least one of the actuators,
   implementation of the shifting operation through recognition of at least one of the actuators with the assistance of variation factors of adapted actuator control variables and/or regulation programs.

3. The method according to claim 1, further comprising the step of one of recording and determining as input variables, one of additively and alternatively, at least one of:
   an accelerator adjustment angle;
   an operating situation on a kick-down-switch on a pedal;
   a brake activation signal for a current position of a service brake of the vehicle;
   one of a vehicle speed and a variable equivalent to vehicle speed;
   a longitudinal acceleration of the vehicle;
   a lateral acceleration of the vehicle;
   a driving resistance;
   a gradient angle of a roadway;
   a current gear being utilized;
   a target gear for a present driving condition;
   a current engine torque of a vehicle transmission;
   a clutch temperature as an indicator of thermal stress conditions of the clutch; and
   a current mass of the vehicle.

4. The method according to claim 2, further comprising the step of one of recording and determining as input variables, one of additively and alternatively, at least one of:
   an accelerator adjustment angle;
   an operating situation on a kick-down-switch on a pedal;

a brake activation signal for a current position of a service brake of the vehicle;
one of a vehicle speed and a variable equivalent to vehicle speed;
a longitudinal acceleration of the vehicle;
a lateral acceleration of the vehicle;
a driving resistance;
a gradient angle of a roadway;
a current gear being utilized;
a target gear for a present driving condition;
a current engine torque of a vehicle transmission;
a clutch temperature as an indicator of thermal stress conditions of the clutch; and
a current mass of the vehicle.

5. The method according to claim 1, further comprising the step of using, as the weighting factors, variables that characterize at least one of:
a type of the vehicle;
a type of the transmission;
performance characteristics of a drive motor; and
a construction of the drive train.

6. The method according to claim 2, further comprising the step of using, as the weighting factors, variables that characterize at least one of:
a type of the vehicle;
a type of the transmission;
performance characteristics of a drive motor; and
a construction of the drive train.

7. The method in accordance with claim 5, further comprising the step of considering, with at least one weighting factor, whether the transmission is in a passenger vehicle, in a truck and in some other commercial vehicle.

8. The method in accordance with claim 6, further comprising the step of considering, with at least one weighting factor, whether the transmission is in a passenger vehicle, in a truck and in some other commercial vehicle.

9. The method according to claim 7, further comprising the step of considering, with at least one weighting factor, whether the commercial vehicle is a long distance transport vehicle, a city delivery vehicle, a travel bus and a cross-country vehicle.

10. The method according to claim 7, further comprising the step of considering, with at least one weighting factor, whether the commercial vehicle is a long distance transport vehicle, a city delivery vehicle, a travel bus and a cross-country vehicle.

11. The method according to claim 9, further comprising the step of multiplying the weighting factors by a respectively assigned standardized input variable.

12. The method according to claim 10, further comprising the step of multiplying the weighting factors by a respectively assigned standardized input variable.

13. The method according to claim 1, further comprising the step of choosing limits of the classification ranges for determination of the shifting sequence depending on at least one of a type of the motor vehicle, the transmission, the performance characteristics of the drive motor and the construction of the drive train.

14. The method according to claim 2, further comprising the step of choosing limits of the classification ranges for determination of the shifting sequence depending on at least one of a type of the motor vehicle, the transmission, the performance characteristics of the drive motor and the construction of the drive train.

* * * * *